Feb. 10, 1953 C. D. GOULD 2,628,338
PORTABLE VOLTAGE SUPPLY FOR RADIATION COUNTERS
Filed Dec. 29, 1950 2 SHEETS—SHEET 1

INVENTOR.
Charles D. Gould
BY
Roland A. Anderson
Attorney

Feb. 10, 1953 — C. D. GOULD — 2,628,338
PORTABLE VOLTAGE SUPPLY FOR RADIATION COUNTERS
Filed Dec. 29, 1950 — 2 SHEETS—SHEET 2

INVENTOR.
Charles D. Gould
BY
Roland A. Anderson
Attorney

Patented Feb. 10, 1953

2,628,338

UNITED STATES PATENT OFFICE 2,628,338

PORTABLE VOLTAGE SUPPLY FOR RADIATION COUNTERS

Charles D. Gould, Cleveland, Ohio, assignor to the United States of America as represented by the United States Atomic Energy Commission Application December 29, 1950, Serial No. 203,416

12 Claims. (Cl. 320—1)

This invention relates generally to a radiation measuring instrument, and specifically to a portable power supply for a radiation measuring instrument incorporating a Geiger tube.

In the past many types of power supplies have been used for operating Geiger tubes, but none of the devices developed by the art have been readily adaptable for portable use. The most obvious type of power supply for a Geiger tube is a battery pack; however, batteries have limited life and are relatively heavy and bulky. These disadvantages become even more apparent when one considers that relatively high voltages are required to operate Geiger tubes together with the fact that the size of a battery increases as its electromotive force increases. Charge capacitors have also been used as power supplies for Geiger tubes, because a capacitor may be charged to a relatively large potential and presents considerably less bulk than would be required with a battery pack to apply an equal potential. However, a capacitor has the disadvantage of losing its charge rather rapidly, both by leakage and by the operation of the Geiger tube, and thus constantly requires recharging by an auxiliary power supply, which is normally non-portable. The present invention utilizes a capacitor in order to eliminate as much bulk as possible, and overcomes the disadvantages by providing means to recharge the capacitor manually.

Hence, one of the objects of this invention is to provide a highly portable Geiger tube radiation measuring instrument that may be continuously used without carrying the instrument to a charging source of re-activation of the power supply.

Another object of this invention is to provide a power supply for a Geiger tube which is easily replenishable by the exertion of manual energy.

Another object of the invention is to provide a power supply which may be restored to its original electromotive force by manual operation and without the use of measuring instruments; and A still further object of the invention is to provide a power supply having an output voltage which is adjustable for use with Geiger tubes requiring different operating potentials.

This invention makes use of a spring-powered generator that is adapted for manual operation as the energy source of the power supply for operating a Geiger tube. The description of the invention will be more comprehensible when read with reference to the drawings, in which.

Figure 1:
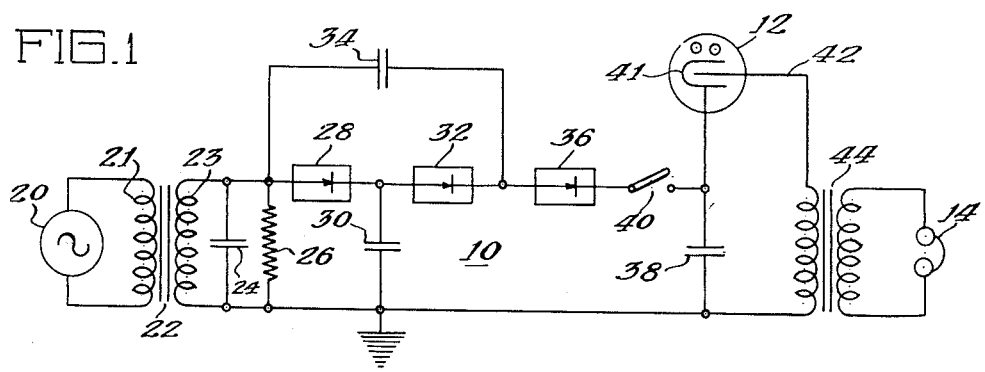
Figure 1 is the schematic circuit diagram of a radiation measuring device incorporating the invention.

As indicated in Figure 1, the radiation measuring instrument consists essentially of three parts, i. e. a generator powered power supply 10, a Geiger counter tube 12, and means, such as a head set 14, for audibly observing the counts produced by the Geiger tube 12 in response to incident radiations.

The spring powered generator 20 is connected across the primary 21 of a voltage step-up transformer 22. A condenser 24 and a resistor 26 are connected in parallel across the secondary 23 of the transformer 22. The transformer secondary 23 and the condenser 24 are selected to form a parallel resonant circuit for approximately the normal operating frequency of the generator 20. A voltage multiplier, of conventional design, consisting of rectifiers 28, 32 and 36 and condensers 30, 34 and 38 is connected across the output of the transformer secondary 23. The three rectifiers 28, 32 and 36 are of the electrolytic type, and are connected in a series current-passing circuit. The first rectifier 28 is connected to one side of the transformer and the third rectifier 36 is connected to the other side of the secondary 23 through condenser 38. Condenser 30 connects with the first rectifier 28 in a closed series circuit also across the secondary 23 of transformer 22. Condenser 34 is connected to shunt the first and second rectifiers 28 and 32. A switch 40 is inserted between the third rectifier 36 and condenser 38. This switch 40 is actuated in response to the rate of rotation of the generator 20, as will be later explained in detail. The anode 41 of the Geiger tube 12 is directly connected to one side of the condenser 38, and the cathode 42 of the Geiger tube 12 is connected to the other side of the condenser 38 through the primary winding of an audio transformer 44. This side of condenser 38 is directly connected to the transformer secondary 23 and is grounded. The head set 14 is connected across the secondary of the audio transformer 44.

Before going into the mechanical details of the spring powered generator 20, it will be helpful to understand the operation of the radiation measuring device. With the generator 20 operating within its range of normal operating frequencies and switch 40 in a closed position, an A. C. potential will build up across the secondary 23 of transformer 22 much greater than the potential of the output from the generator 20 alone. This results from the fact that the transformer secondary 23 has more turns than the primary 21, and hence the voltage will be stepped-up, and by the fact that condenser 24 and transformer secondary 23 form a resonant circuit at a frequency within the normal range of operating frequencies of the generator 20. It is also clear, that very little voltage will develop across secondary 23 of transformer 22 if the operating frequency of the generator 20 is not approximately equal to the resonant frequency of the circuit formed by the secondary 23 and condenser 24. This means that the maximum voltage attainable at the secondary 23 of the transformer 22 is that attainable when the generator 20 is operating at the resonant frequency of the circuit formed by the transformer secondary 23 and the condenser 24, and that this potential is readily reproducible due to the fact that it is the maximum voltage that may be attained across the secondary 23 of the transformer 22. The sharp voltage to frequency characteristic common with resonant circuits is somewhat flattened by the loading resistor 26, thus permitting a reasonable variation in the operating frequency of the generator 20. The curve shown by Figure 6 clearly illustrates the power supply output voltage for different generator frequencies.

Voltage multipliers are well known, and hence a brief description of the operation of the voltage multiplier will suffice. The rectifiers 28, 32 and 36 will only pass current in one direction, the direction of the arrow used in their schematic symbol. Hence, during the portion of the cycle when the end of the transformer secondary 23 that is connected directly to the rectifier 28 is positive, hereafter referred to as the positive portion of the cycle, current will flow through rectifier 28 charging condenser 30 to a potential approaching the maximum potential appearing across the transformer secondary 23. Throughout the other half cycle of the generator 20, termed the negative portion of the cycle, a negative potential appears on the end of the transformer secondary connected to the rectifier 28, but since current will not flow in the reverse direction through rectifier 28, the rectifier 28 remains inoperative through this half of the cycle and the charge placed upon condenser 30 during the positive portion of the cycle cannot leak off. During the negative portion of the cycle rectifier 32 becomes operative and passes the positive charge from capacitor 30 in series with the E. M. F. appearing across the transformer secondary 23 to charge capacitor 34 to a potential approaching twice the maximum potential developed across the transformer secondary 23. In like manner condenser 38 is charged to a potential approaching three times the maximum voltage appearing across transformer secondary 23, since the E. M. F. across the transformer secondary 23 and across the condenser 34 will add on the positive half of the cycle and pass through the rectifier 36 to charge condenser 38. Condensers 30, 34, and 38, of course, become fully charged only after a substantial number of cycles have been completed.

After condenser 38 has been charged to its maximum potential, generator 20 may be stopped and the switch 40 opened. As will be explained in connection with the details of the generator 20, the switch 40 is automatically actuated so that it is closed only during periods when the generator 20 is in operation. By opening the switch 40 before the generator 20 is braked, the charge developed upon condenser 38 will be prevented from leaking off through any portion of the rectifier circuit, and condenser 38 will remain charged to full voltage despite the fact that the generator voltage itself falls rapidly as the rotor is slowed and finally stopped. None the less, there remain two electrical paths through which the condenser 38 may be discharged. The one path is through the Geiger tube 12, and the loss of charge through this tube will depend upon the number of counts per minute that occur in the Geiger tube 12. This is, of course, a function of the radiation to which the Geiger tube 12 is subjected. The other path by which condenser 38 may be discharged is its leakage path. For this reason, condenser 38 should be a capacitor having a leakage resistance of the order of $10^{-13}$ ohms, although capacitors with smaller leakage resistances may be used, but such capacitors will necessitate more frequent rechargings.

The audio transformer 44 connected between the Geiger tube 12 and the head set 14, is designed to properly match the impedance of the head set to the output circuit of the Geiger tube 12. It is also designed to flatten the sharply spiked counting pulses appearing in the output circuit of the Geiger tube 12 in order to make them easily transmitted by an audio circuit.

Figure 3:
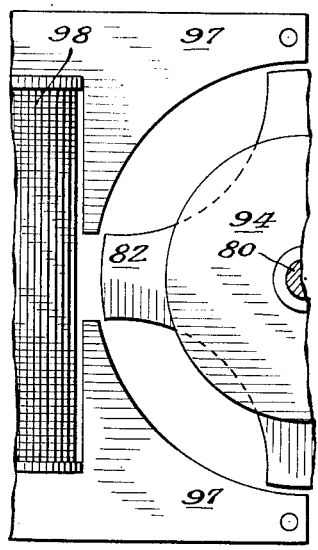
Figure 3 is a fragmentary sectional view of the spring powered generator taken along line 3—3 of Figure 2 showing the relation of the generator coil to the other parts of the generator.
Figure 2:
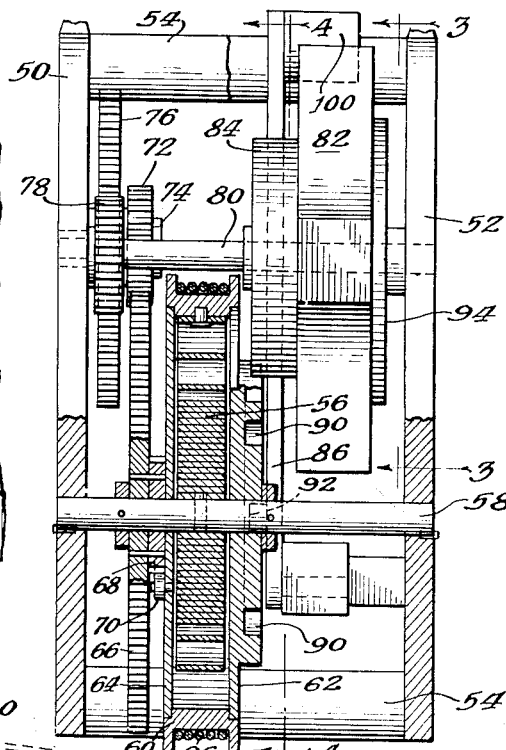
Figure 2 is a side view of the spring powered generator with the generator coil removed, partially in section, as indicated by the line 2—2 in Figure 4.
Figure 4:
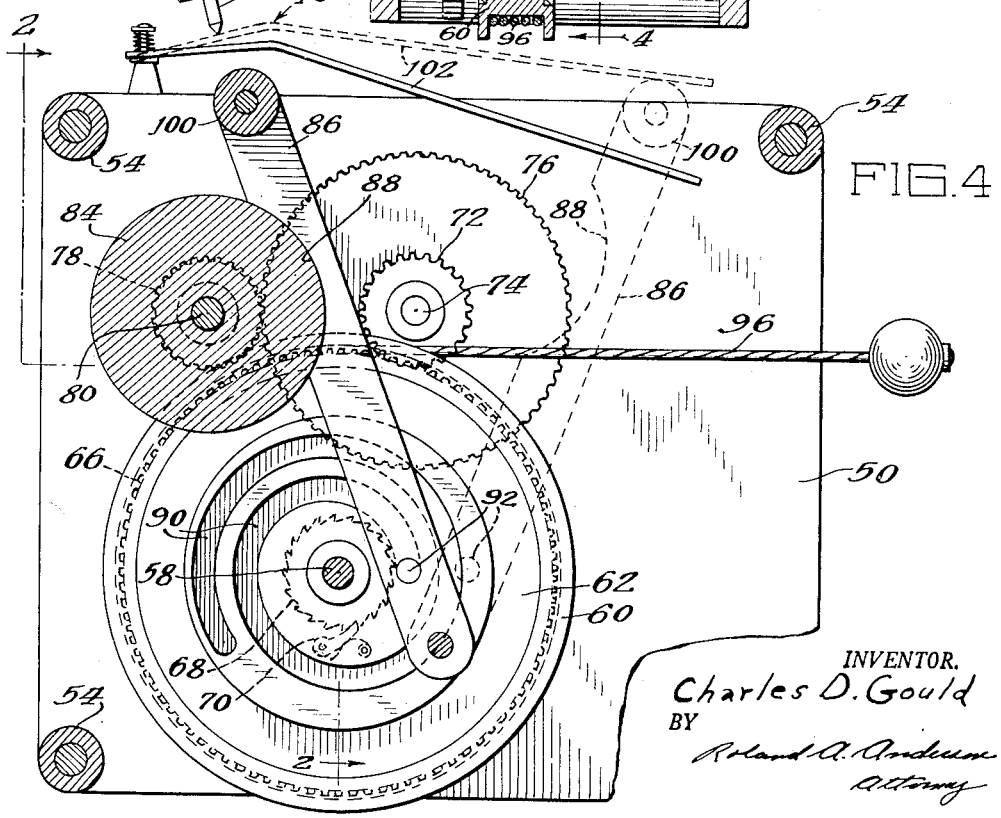
Figure 4 is a sectional view of the spring powered generator taken along line 4—4 of Figure 2.

The details of the spring powered generator 20 are shown in Figures 2, 3 and 4. The entire generator is mounted within a housing including a front plate 50, a back plate 52 and a suitable number of cross members 54 holding the plates 50 and 52 rigid with respect to each other. A spiral spring 56 is secured at its inner end to a stationary shaft 58. The shaft 58 is rigidly secured to the plates 50 and 52 of the housing. The outer end of the spring 56 is secured to a spring barrel 60, and is enclosed within the spring barrel 60 by a disk 64 on the outer surface of which is a spiral cam 62. Both the spiral cam 62 and the disk 64 are rigidly affixed to the spring barrel 60, but rotatably mounted on the shaft 58. A gear 66 is also rotatably mounted on the stationary shaft 58 contiguous to the disk 64, and it is coupled to the disk 64 by means of a ratchet 68 secured to the gear 66 and a pawl 70 secured to the disk 64 which permit the gear 66 to remain stationary when the spring barrel 60 is turned in the direction to wind the spring but forces the gear 66 to rotate when the barrel 60 is rotated in the opposite direction. The gear 66 is meshed with a smaller idling gear 72 which is secured to a rotatable idling shaft 74. Also rigidly secured to the idling shaft 74 is a large idling gear 76 which is mounted in front of the small idling gear 72. The large idling gear 76 is meshed with a rotor gear 78. The rotor gear 78 is securely attached to a rotor shaft 80 which is rotatably mounted between plates 50 and 52 of the housing. A magnetic rotor 82 is rigidly mounted on the rotor shaft 80, and rotates with the shaft 80. Secured to the front surface of the rotor 82 is a protruding drum 84 which is adapted to be used as a brake drum. An arm 86 is pivotally mounted on the back plate 52, and is provided with a circular indenture 88 which is adapted to contact the drum 84 in the manner of a brake shoe. The arm 86 is coupled by means of a pin 92 to a spiral slot 90 disposed about the transverse axis of the spiral cam 62.

The rotor 82 is formed from a circular piece of magnetic metal, and has four symmetrically spaced arcuate segments cut from the periphery thereof in order to provide four protruding pole pieces. The rotor 82 is magnetized in a manner such that pole pieces which are disposed oppositely to each other have the same magnetic poles. A magnetic shorting plate 94 is mounted adjacent to the back side of the magnetic rotor 82. A coil 98 is mounted upon a magnetic core provided with two circularly shaped pole portions 97, as shown in Figure 3. The core is mounted on the plate 52 so that the pole portions 97 are contiguous to the path of the rotor 82. It is to be noted that the pole portions 97 are mounted 90 electrical degrees apart, so that the current is reversed in coil 98 for every 90 degrees of rotation of the rotor 82. A cord 96 is attached to the outer periphery of the spring barrel 60, and wound thereabout.

The spring 56 is under considerable tension, even in the unwound position, so that pulling the cord 96 from the spring barrel 60 merely adds about two complete revolutions of tension to the spring 56. The rotation of the spring barrel 60 in the direction to wind the spring is effective to release the arm 86 from the drum 84, thus making it possible for the rotor 82 to rotate. This is accomplished due to the fact that the spiral cam 62 rotates with the spring barrel 60, and, in effect, pushes the arm 86 away from the drum 84, because the pin 92 is forced away from the axis of the spiral cam 62 upon rotation thereof in this direction. There is no tendency for the rotor 82 to rotate until the tension placed upon the cord 96 in further winding the spring 56 has been released, because the ratchet 68 and pawl 70 permit the spring barrel 60, disk 64 and spiral cam 62 to rotate in the wind direction without engaging the gear train consisting of gears 66, 72, 76 and 78. However, when the tension is released from the cord 96, the disk 64 is securely locked to the gear 66 by the ratchet 68 and pawl 70, thus rotating the gear 66 upon the sationary shaft 58. Since the gear 66 is meshed with the small idling gear 72, the idling shaft 74 will rotate at a considerably greater rate than the spring barrel gear 66. The large idling gear 76 will rotate at the same rate as the small idling gear 72, but since the rotor gear 78 is considerably smaller than the large idling gear 76, it will rotate at a much greater rate than the large idling gear 76. In this manner, the rotor 82, which is connected to the same shaft as the rotor gear 78, is made to rotate at a much more rapid rate than the spring barrel gear 66.

Figure 6:
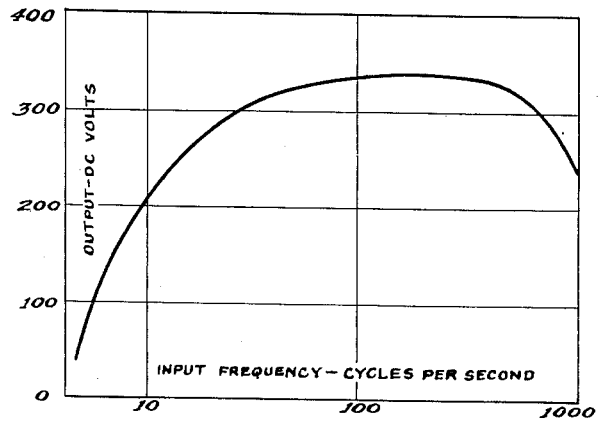
Figure 6 is a graph of the output voltage of the power supply for various frequencies of the generator output.
Figure 5:
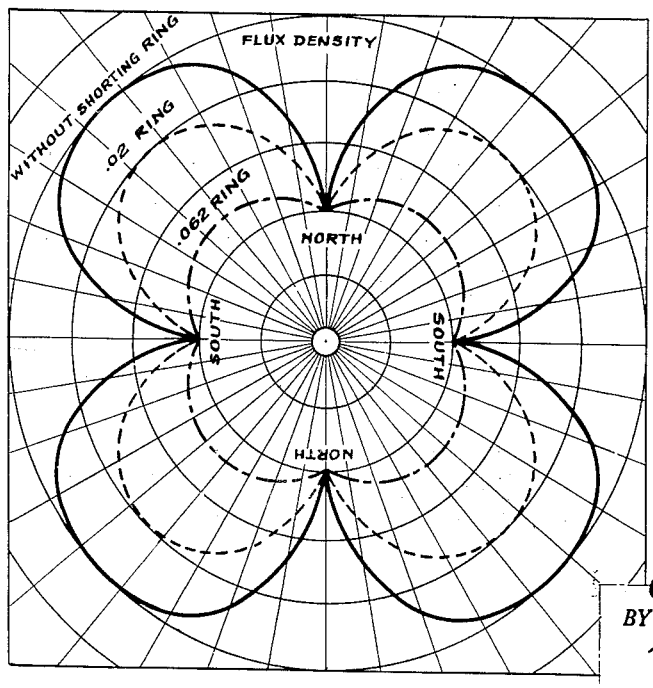
Figure 5 is a graph showing the rotor field patterns for various thicknesses of shorting rings constituting a part of the generator.

The rotor field pattern, shown in Figure 6, exhibits four symmetrically placed lobes of alternate polarity about the axis of rotation of the rotor 82. When these lobes are rotated, they set up rapidly varying magnetic fields within the field coil 98, and in a manner well known in the art, generate an electric current flowing within the field coil 98. The magnitude of the current set up within the field coil 98 may be decreased by the use of the shorting plate 94 affixed to the rear side of the rotor 82, since the shorting plate 94 reduces the intensity of the magnetic field emanating from the rotor 82, as shown in Figure 5. In this manner, the voltage generated by the spring powered generator 20 may be cut down to supply the proper operating voltage for a Geiger tube 12 which operates at a lower voltage than the one delivered by the power supply using the generator 20 without a shorting plate 94.

The arm 86 has another function in addition to acting as a brake shoe to stop the generator 20. The rounded end 100 also is effective to push a flexible metal contact strip 102 into contact with a stationary contact 104, as detailed in Figure 4. The contacts 102 and 104 make up the elements of switch 40 which isolates the charged condenser 38 from the rest of the power supply circuit 10. Contact 104 merely consists of a heavy wire entirely supported by one of the terminals of condenser 38. In this manner, winding the spring 56 by pulling the cord 96 automatically closes the switch 40, and condenser 38 is connected in the circuit. Also the condenser 38 will again be automatically disconnected from the rest of the power supply circuit 10 just prior to the time when the arm 86 brakes the generator 20.

If the load resistor 26 is large enough, the maximum output voltage of the power supply may be made to be relatively constant over a rather broad range of generator frequencies, as is the case shown in the graph of Figure 6. If this is the case, it is clearly possible to open the switch 40 in this range and thus avoid any leakage of the charge on the storage capacitor 38 through the rectifiers. However, if larger voltages are to be obtained from the power supply, the maximum voltage will be obtained rather sharply at the generator rotation rate corresponding to the frequency of resonance of the transformer secondary 23 and the condenser 24, and the output voltage will be substantially less for all other frequencies. Thus, for applications requiring relatively high voltages, it will be desirable to use a relatively small load resistor and to select the frequency of resonance of the transformer secondary 23 and the capacitor 24 at a frequency slightly below the maximum frequency of the current generated by the generator 20. The switch 40 is then adjusted to open at a generator frequency greater than the frequency of the generator 20 corresponding to the resonant frequency of the transformer secondary 23 and capacitor 24, but before the rotation rate of the generator 20 decreases. In this manner, the condenser 38 may be totally charged while the rotation rate of the generator is increasing, and the switch 40 will open before the power supply voltage decreases sufficiently to make leakage through the rectifier circuit a serious problem.

In one particular embodiment of the invention, the generator 20 was found to generate an alternating current with a frequency exceeding 150 cycles per second. The transformer secondary 23 and capacitor 24 were selected to form a tuned circuit at this frequency (approximately 200 henries and .005 mfd., respectively). Proper loading of this tuned circuit was achieved by making resistor 26 of the order of 5 megohms resistance, since this value was effective to charge condenser 38 to approximately 300 volts. The voltage to which condenser 38 will be charged may be adjusted by either selecting a thicker shorting plate 94 for the generator 20, or by varying the size of the load resistor between the limits of approximately 1 and 8 megohms. Figure 6 shows the effect on the magnetic field of placing magnetic shorting rings with .02 inch and .062 inch thicknesses adjacent to the rotor 82. The transformer 22 may have a turns ratio of 150:1, a primary resistance of 10 ohms, a secondary resistance of 9,000 ohms, a primary inductance of 130 mh., and a secondary inductance of 290 henris. The rectifiers 28, 32 and 36 may be of the electrolytic type and have a forward resistance of 1½ megohms and a back resistance of 500 megohms at 15 volts. Condensers 30 and 34 may have a capacitance of .01 microfarad. A suitable condenser for condenser 38 was found to have a capacity of .1 microfarad and an operating voltage of 450 volts. The condenser was housed in a hermetically sealed container with connections terminated through Kovar to glass seals, and had a leakage resistance of approximately $2 \times 10^{13}$ ohms. Using a type VG7 Geiger tube, and having a background counting rate of approximately 25 counts per minute, it has been found that an instrument constructed as here described needs to be recharged approximately every two hours. The permissible amount of charge which may be dissipated before condenser 38 is recharged is determined by the operating characteristics of the Geiger tube, since the tube must always have sufficient voltage to operate upon the plateau at which the counting rate remains relatively independent of the operating voltage. With a type VG7 Geiger tube, it has been found that the voltage may vary over a range of approximately 285 to 340 volts.

A radiation measuring instrument of the type described obviously has a practically infinite shelf life, and may be operated without servicing until there is a breakdown of the circuit elements. If a type VG7 Geiger tube is used, the tube is able to count approximately $5 \times 10^7$ counts, and this should be the theoretical operating life of the instrument before replacements or services are required.

Other embodiments utilizing the inventive features disclosed in this specification will be readily apparent to the man skilled in the art. Hence, the scope of the invention should in no manner be limited by the specific embodiments described, but rather by the following claims.

What is claimed is:

1. A power supply comprising, in combination, means to generate a D. C. voltage including a spring powered generator, capacitive storage means connected to the means to generate, a switch connected between the storage means and the means to generate, and means connected to the means to generate for actuating the switch, said means closing the switch only during the period of time during which the means to generate is operating.

2. A power supply comprising the elements of claim 1 wherein the means to generate a D. C. voltage consists of an A. C. generator, and a rectifier connected to the generator.

3. A power supply comprising, in combination, the elements of claim 1 wherein the means to generate a D. C. voltage comprises an A. C. generator, a rectifier, and a step-up transformer connecting the generator to the rectifier, and the capacitive storage means consists of a storage condenser.

4. A power supply comprising, in combination, a spring powered generator, a storage capacitor electrically connected to the generator, a switch connected between the spring powered generator and the storage capacitor, and actuation means mechanically coupling the switch to the spring powered generator for closing the switch during periods in which the generator is generating a voltage and opening the switch during periods in which the generator is not generating a voltage.

5. A power supply comprising, in combination, the elements of claim 4 wherein the actuating means consists of a spiral cam connected to the generator and rotatable in response to the operation of the generator, and an arm pivotally keyed to the spiral cam and engaging the switch for opening and closing the switch.

6. A power supply comprising, in combination, a spring powered A. C. generator, a rectifier connected to the generator, a storage capacitor electrically connected to the rectifier, a switch connected between the rectifier and the storage capacitor, actuating means mechanically coupling the switch to the generator for closing the switch only during periods in which the generator is generating a voltage, and a resonant circuit connected between the generator and the rectifier, the frequency of resonance of said circuit being less than the maximum frequency of the alternating current generated by the generator.

7. A power supply comprising, in combination, a spring powered A. C. generator, a rectifier connected to the generator, a storage capacitor electrically connected to the rectifier, a switch connected between the storage capacitor and the rectifier, a resonant circuit connected between the generator and the rectifier, the frequency of resonance of said circuit being less than the maximum frequency of the current generated by the generator, and means to actuate the switch connected between the generator and the switch, said means closing the switch during periods in which a voltage is being generated by the generator and opening the switch during periods in which the generator is not generating a voltage.

8. A power supply comprising, in combination, the elements of claim 7 wherein the means to actuate the switch consists of a spiral cam mechanically connected to the generator and rotatable in response to the operation of the generator, and an arm pivotally keyed to the spiral cam and coupled to the switch.

9. A power supply comprising, in combination, the elements of claim 6 and a step-up transformer connected between the generator and the resonant circuit, wherein the resonant circuit consists of the transformer secondary winding and a condenser connected in parallel therewith.

10. A power supply comprising, in combination, an A. C. generator comprising an induction coil having a magnetic core and a magnetic pole piece on each of the opposite ends of the core, said pole pieces extending from the coil and having a circular segment cut away from each of the pole pieces with a common center and radius of curvature, a permanent magnet rotor rotatably mounted with its axis of rotation coinciding with the center of curvature of the pole pieces, and having a radius of revolution slightly less than the radius of curvature of the pole pieces, and a magnetic shorting plate fixed between the poles of the rotor and rotatable therewith about the rotor's axis of rotation to attenuate the magnetic field of the rotor, a step-up transformer having a primary and a secondary, said primary being connected to the generator, a capacitor connected across the secondary of the transformer, said transformer secondary and capacitor forming a parallel resonant circuit with a resonant frequency slightly less than the maximum frequency of the current generated by the generator, a loading resistor connected across the secondary of the transformer, a voltage multiplying circuit and rectifying circuit connected across the secondary of the transformer, a storage capacitor connected to the output of the multiplying and rectifying circuit, a switch connected between the storage capacitor and the multiplying and rectifying circuit, and means to actuate the switch in response to the operation of the generator connected to the generator, said means closing the switch during periods in which the rotation rate of the rotor is increasing, and opening the switch after frequency of the generated voltage exceeds the resonant frequency of the transformer secondary and condenser.

11. A power supply comprising, in combination: an A. C. generator including an induction coil having a magnetic core and a magnetic pole piece on each of the opposite sides of the core, said pole pieces extending from the core and having a circular segment cut away from each of the pole pieces with a common center and radius of curvature, a permanent magnet rotor rotatably mounted within its axis of rotation coinciding with the center of curvature of the pole pieces, and having a radius of revolution slightly less than the radius of curvature of the pole pieces, and a magnetic shorting plate affixed between the poles of the rotor and rotatable therewith about the rotor's axis of rotation to attenuate the magnetic field of the rotor, spring powered means to rotate the rotor, said means including a stationary shaft, a spiral spring mounted about the shaft with its inner end securely attached thereto, a spring barrel rotatably mounted about the shaft and surrounding the spiral spring, the outer end of the spiral spring being rigidly connected to the spring barrel, a spiral cam rotatably mounted on the shaft and securely affixed to the spring barrel, a braking hub rigidly attached to the rotor, and an arm pivotally keyed to the spiral cam, said arm having a circular segment cut therefrom with a radius of curvature approximately equal to the radius of the braking hub forming a braking shoe, the braking hub on the rotor being mounted contiguous to the braking shoe on the arm; a step-up transformer having a primary and a secondary, said primary being connected to the coil of the generator; a condenser connected across the secondary, said secondary and condenser forming a resonant circuit having a resonant frequency slightly below the maximum frequency of the current generated by the generator; a loading resistor connected across the secondary of the transformer; a voltage multiplier and rectifier connected across the secondary of the transformer; a storage capacitor connected to the output of the voltage multiplier and rectifier; and a switch connected between the storage capacitor and the voltage multiplier and rectifier, said switch being mechanically connected to the arm on the generator, whereby winding the spiral spring by rotating the spring barrel releases the brake shoe from the braking hub on the rotor and closes the switch.

12. A power supply comprising, in combination: an A. C. generator including an induction coil having a magnetic core and a magnetic pole piece on each of the opposite ends of the core, said pole pieces extending from the core and having a circular segment cut away from each of the pole pieces with a common center and radius of curvature, a permanent magnet rotor rotatably mounted with its axis of rotation coinciding with the center of curvature of the pole pieces, and having a radius of revolution slightly less than the radius of curvature of the pole pieces, and a magnetic shorting plate affixed between the poles of the rotor and rotatable therewith about the rotor's axis of rotation to attenuate the magnetic field of the rotor, spring powered means to rotate the rotor, said means including a stationary shaft, a spiral spring mounted about the shaft with its inner end securely attached thereto, a spring barrel rotatably mounted about the shaft and surrounding the spiral spring, the outer end of the spiral spring being rigidly connected to the spring barrel, a spiral cam rotatably mounted on the shaft and securely affixed to the spring barrel, a braking hub rigidly attached to the rotor, and an arm pivotally mounted and keyed to the spiral cam, said arm having a circular segment cut therefrom with a radius of curvature approximately equal to the radius of the braking hub forming a braking shoe, the braking hub on the rotor being mounted contiguous to the braking shoe on the arm; a voltage rectifier connected to the coil of the generator; a storage capacitor connected to the voltage rectifier; and a switch connected between the storage capacitor and the voltage rectifier, said switch being mechanically connected to the arm on the generator, whereby winding the spiral cam by rotating the spring barrel releases the brake shoe from the braking hub on the motor and closes the switch.

CHARLES D. GOULD.

REFERENCES CITED

The following references are of record in the file of this patent:

UNITED STATES PATENTS

| Number | Name | Date |
| --- | --- | --- |
| 468,451 | Hunt | Feb. 9, 1852 |
| 580,335 | Libbey | Apr. 6, 1897 |
| 1,932,033 | Dawson | Oct. 24, 1933 |
| 2,232,452 | Harmon | Feb. 18, 1941 |
| 2,325,952 | Hampton et al. | Aug. 3, 1943 |
| 2,401,723 | Deming | June 11, 1946 |
| 2,409,967 | Weisglass | Oct. 22, 1946 |
| 2,498,640 | Beck | Feb. 28, 1950 |
| 2,503,017 | Wisman | Apr. 4, 1950 |
| 2,525,817 | MacAdams | Oct. 17, 1950 |
| 2,530,705 | Klemperer | Nov. 21, 1950 |
| 2,579,318 | Hershberger | Dec. 18, 1951 |

FOREIGN PATENTS

| Number | Country | Date |
| --- | --- | --- |
| 603,372 | Great Britain | June 15, 1948 |